(12) United States Patent
Christ et al.

(10) Patent No.: US 8,244,447 B2
(45) Date of Patent: Aug. 14, 2012

(54) SPARK PLUG HAVING A THERMOSENSOR

(75) Inventors: Ansgar Christ, Sindelfingen (DE); Thorsten Heidinger, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 12/694,875

(22) Filed: Jan. 27, 2010

(65) Prior Publication Data

US 2011/0184625 A1 Jul. 28, 2011

(51) Int. Cl.
*H01T 13/20* (2006.01)
*H01T 13/22* (2006.01)

(52) U.S. Cl. .................. 701/102; 121/146.5 R

(58) Field of Classification Search ........... 123/146.5 R, 123/169 R, 169 EL, 153, 154; 701/102; 374/144; 313/140–145
See application file for complete search history.

(56) References Cited

U.S. PATENT DOCUMENTS

| 3,940,987 | A | * | 3/1976 | Green et al. .................. 374/144 |
| 4,361,036 | A | * | 11/1982 | Levenson .................. 73/114.72 |
| 4,984,905 | A | | 1/1991 | Amano et al. |
| 5,024,534 | A | * | 6/1991 | Matsubara et al. ........... 374/144 |
| 5,669,714 | A | * | 9/1997 | Runne .......................... 374/208 |
| 5,889,460 | A | * | 3/1999 | Bachmann et al. ............. 338/28 |
| 2009/0080492 | A1 | * | 3/2009 | Takeuchi ...................... 374/144 |

FOREIGN PATENT DOCUMENTS

DE 40 10 609 10/1990

* cited by examiner

*Primary Examiner* — Mahmoud Gimie
(74) *Attorney, Agent, or Firm* — Kenyon & Kenyon LLP

(57) ABSTRACT

A spark plug includes a ground electrode, a center electrode and a thermosensor for detecting a temperature, the thermosensor being situated on a combustion chamber-side end of the spark plug near the combustion chamber, and an end area of the thermosensor being situated so that it is exposed on the spark plug. In addition, an internal combustion engine having a spark plug is provided.

15 Claims, 2 Drawing Sheets

SPARK PLUG HAVING A THERMOSENSOR

FIELD OF THE INVENTION

The present invention relates to a spark plug having an integrated thermosensor and an internal combustion engine having such a spark plug.

BACKGROUND INFORMATION

Spark plugs for internal combustion engines are known in various embodiments from the related art. German Patent No. DE 40 10 609, for example, describes a spark plug having a temperature sensor and a pressure sensor. The temperature sensor is situated in a borehole in the center electrode, implemented from one side facing away from the combustion chamber. The pressure sensor is situated laterally on the spark plug. The temperature sensor detects a temperature of the center electrode to detect temperature fluctuations in the center electrode. However, the resulting changes in temperature in the center electrode may be detected only slowly. Accurate measurements of temperature conditions directly in the combustion chamber are impossible. However, to allow optimum control of an internal combustion engine during operation, it is necessary to obtain the most accurate possible values of various parameters in the combustion chamber, and the values in particular should be obtained.

SUMMARY OF THE INVENTION

The spark plug according to the present invention has the advantage over the related art that it allows a cycle-based detection of parameters in the combustion chamber of the internal combustion engine. Nevertheless, the spark plug according to the present invention has a very compact and inexpensive design. This is achieved according to the present invention by the fact that the spark plug has a thermosensor, which is situated on a combustion chamber-side end of the spark plug, for detecting a temperature. One end area of the thermosensor is situated on the spark plug so that it is exposed. The exposed end area of the thermosensor is therefore situated in the combustion chamber in the installed state, so that it is able to record measured data directly from the combustion chamber. The thermosensor is designed in such a way that it is able to detect the temperature values very rapidly, so that a cycle-resolved analysis of processes in the combustion chamber may be performed. Since the thermosensor protrudes into the combustion chamber, it is thus possible, with compact internal combustion engines having a small displacement in particular, to detect parameters directly from the combustion chamber. In particular, unwanted deviations in value acquisition, such as those which occur with sensors situated on a combustion chamber wall, are avoided due to the exposed and protruding position of the thermosensor according to the present invention. Accurate cycle-corrected values may thus be determined according to the present invention and used for control of the internal combustion engine.

The thermosensor is preferably adjacent to the ground electrode in particular. This makes it possible for the thermosensor to supply an accurate value for a temperature in an ignition cycle. Alternatively, the thermosensor is situated opposite the ground electrode. It is possible in this way for a temperature to be detectable over the combustion sequence.

Furthermore, the thermosensor of the spark plug is preferably designed in such a way that a layer containing chromium is situated on an end area of the thermosensor and a protective layer is applied to the layer containing chromium. The thermosensor is designed in such a way that a layer containing chromium is used instead of a thermocouple and the two thermolines are connected via the layer containing chromium. The protective layer protects the layer containing chromium during operation of the internal combustion engine. Through this design, it is possible for the thermosensor to be able to record temperatures very rapidly and accurately.

Alternatively, instead of the layer containing chromium, a layer containing nickel or platinum may also be used.

The layer containing chromium is preferably manufactured from pure chromium in particular. Alternatively, the layer containing chromium is manufactured from an electrically conductive chromium oxide.

Furthermore, the protective layer is preferably a layer containing carbon and is in particular a layer containing C2 carbon (amorphous carbon layer). More preferably, the layer containing carbon may also be made of pure carbon, e.g., graphite.

To ensure the most complete possible protection of the layer containing chromium, the protective layer is provided on the end face of the end area of the thermosensor and on lateral shell areas of the end area. In particular the protective layer on the lateral shell areas covers the layer containing chromium so that it is completely surrounded by the protective layer.

To provide the simplest and least expensive possible design of the spark plug, the thermosensor is preferably passed through a housing of the spark plug. In particular the thermosensor is passed through a borehole within a spark plug thread.

In particular, the layer containing chromium is preferably designed in such a way that it has a layer thickness between 0.1 μm and 10 μm, in particular 2 μm. Furthermore, the protective layer more preferably has a layer thickness between 0.1 μm and 10 μm and in particular 0.2 μm. According to another preferred embodiment of the present invention, a layer thickness of the layer containing chromium and a layer thickness of the protective layer are the same. In this way an especially compact end area having excellent sensor properties may be made available.

Moreover, the end area of the thermosensor is preferably designed to be cylindrical, with the layer containing chromium and the protective layer oriented perpendicular to the axial direction of the cylindrical end area.

According to another preferred embodiment of the present invention, the end area of the thermosensor in the axial direction of the spark plug is designed in such a way that the outermost point on the end area protrudes the same distance as or less than the ground electrode from a spark plug base plane. This makes it possible to ensure that the end area of the thermosensor protruding away from the spark plug base plane does not protrude too far into the combustion chamber and does not have any interfering influences on the combustion behavior, the ignition, or the fuel injection behavior, and there is no risk of contact with the piston.

Furthermore, the present invention preferably relates to an internal combustion engine having a spark plug according to the present invention. In addition to a combustion chamber, the internal combustion engine also has a control unit for controlling the internal combustion engine. According to the present invention, the term "control unit" is understood to refer to a unit capable of executing both control and regulating operations. In particular, the control unit may execute a change in injection, a change in valve opening and closing times, a change in an ignition time, etc. The internal combustion engine according to the present invention is provided in such a way that the control unit is connected to the thermosensor on the spark plug, and the control unit is designed to control the internal combustion engine, based on the values transmitted by the thermosensor. In this way, cycle-specific control of the internal combustion engine may be implemented, because the thermosensor supplies high-resolution signals to the internal combustion engine. Excellent in-engine control and regulation of the internal combustion engine is thus made possible by the rapid thermosensor. No additional installation space for the thermosensor need be provided on the internal combustion engine because the thermosensor is an integral component of the spark plug.

In particular, the control unit preferably controls the internal combustion engine based on pressure values calculated by the control unit from the temperature values received from the temperature sensor. The inventors have discovered that the pressure values vary essentially similarly to the temperature values in the combustion chamber, i.e., the significant features of the combustion chamber pressure signal may also be found similarly in the temperature signal. However, improved control or regulation of the internal combustion engine may thus be made possible, because for control of the internal combustion engine, the most accurate possible pressure conditions in the combustion chamber are more important than the temperature characteristics in the combustion chamber.

DETAILED DESCRIPTION

A spark plug 1 according to a preferred exemplary embodiment of the present invention is described in detail below with reference to FIGS. 1 to 3.

Figure 1:
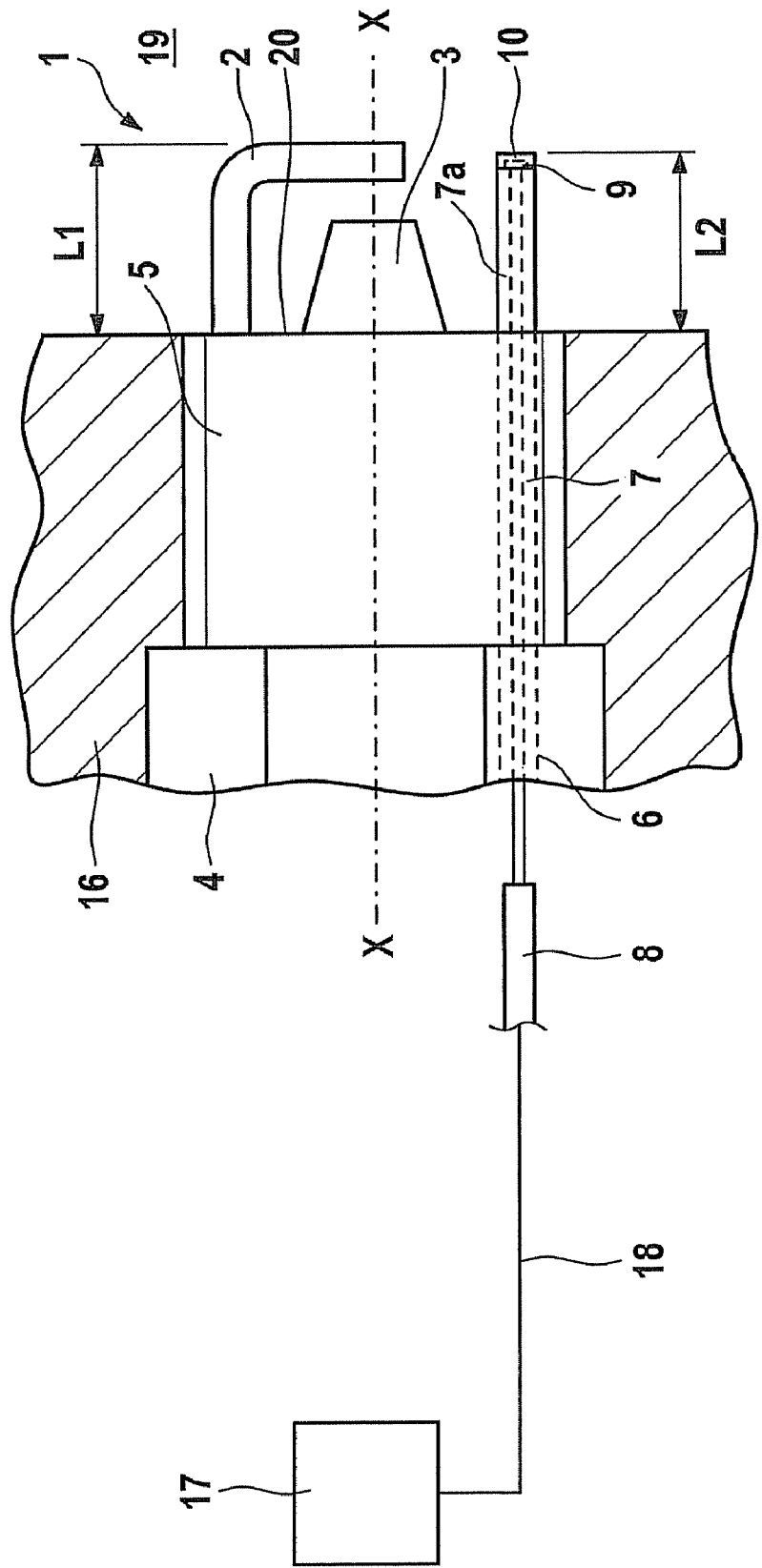
FIG. 1 schematically shows a partially sectional view of a spark plug according to a preferred exemplary embodiment of the present invention.

As FIG. 1 shows, the spark plug is designed in the known manner in general, including a ground electrode 2, a center electrode 3, a shell 4 and a housing 5 provided on the shell for fixation of spark plug 1 in a cylinder head 16. Furthermore, spark plug 1 according to the present invention has a thermosensor 7, which is situated in a borehole 6 in the spark plug. Borehole 6 is formed in shell 4 of the spark plug.

As FIG. 1 also shows, thermosensor 7 is connected to a control unit 17 by a connecting line 18. Control unit 17 receives signals from the thermosensor and controls or regulates the combustion process in an internal combustion engine. FIG. 1 schematically shows a combustion chamber 19 of the internal combustion engine.

As FIG. 1 shows, a length L1 of ground electrode 2, starting from a base plane 20 of the spark plug, is somewhat longer than length L2 of exposed end area 7a of thermosensor 7. This ensures that the thermosensor does not protrude too far into combustion chamber 19 and possibly collide with a piston in the combustion chamber.

Figure 2:
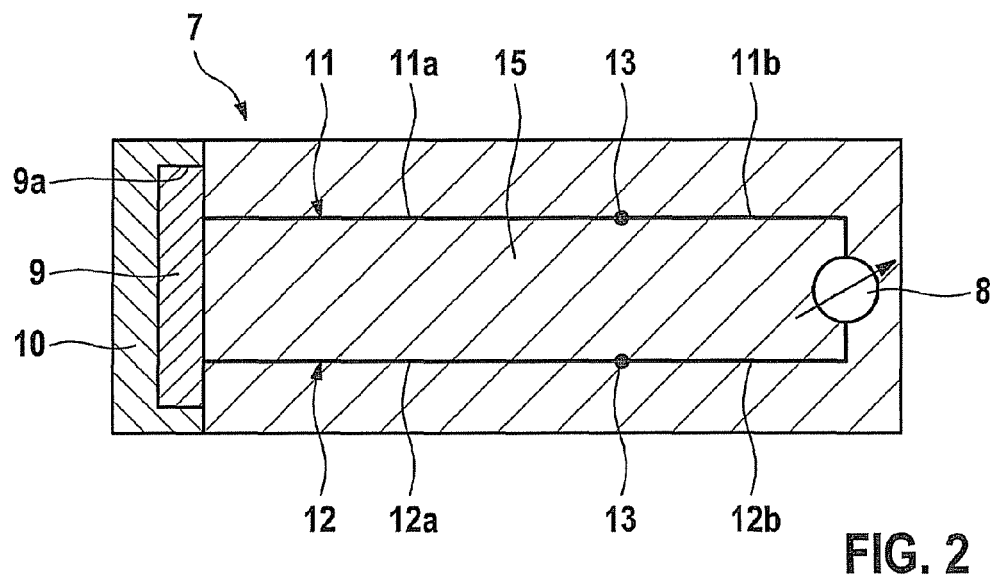
FIG. 2 schematically shows a basic diagram of the spark plug according to the present invention.

FIG. 2 shows thermosensor 7 in detail. As FIG. 2 shows, thermosensor 7 includes a base body 15, in which a first thermoline 11 and a second thermoline 12 are situated. First thermoline 11 includes a first line section 11a, which is manufactured from nickel, and a second line section 11b, which is manufactured from copper. Second thermoline 12 includes a first line section 12a, which is manufactured from nickel-chromium, and a second line section 12b, which is manufactured from copper. With both thermolines 11, 12, reference points 13 are provided at the junction between the first and second line sections. Furthermore, a measurement device 8 is provided to detect a voltage on second line sections 11b, 12b manufactured of copper. As FIG. 2 shows, in contrast with the known thermosensors, in the thermosensor according to the present invention, the thermocouple including first line sections 11a and 12a is not welded together. Instead, in the thermosensor according to the present invention, a layer 9 containing chromium is situated on the exposed end area of thermosensor 7. Layer 9 containing chromium connects two thermolines 11, 12 together. Furthermore, thermosensor 7 according to the present invention includes a protective layer 10, which is embodied over layer 9 containing chromium. As FIG. 2 shows, a thickness of layer 9 containing chromium is the same as a thickness of protective layer 10, and in this exemplary embodiment, the thicknesses of each may be 2 μm. Furthermore, protective layer 10 is embodied in such a way that it also covers and protects a lateral shell area 9a of layer 9 containing chromium. Thus, thermosensor 7 supplies a thermovoltage, the level of which depends on a difference between the measurement temperature at the measurement point on layer 9 containing chromium and the temperature at reference point 13. The thermosensor is situated in spark plug 1 in such a way that reference point 13 is preferably situated in shell 4 to obtain the most constant possible temperature at reference point 13.

As shown in FIG. 1, free end 7a of thermosensor 7 is exposed and protruding from a base plane 20 of spark plug 1. End area 7a thus protrudes into combustion chamber 19. Thermosensor 7 is therefore able to pick up temperatures directly in combustion chamber 19. By using layer 9 containing chromium on the outermost end of end area 7a of thermosensor 7, very rapid detection of the temperature in the combustion chamber is made possible. It is possible in this way to detect all the influences of combustion in the combustion chamber during one cycle of the internal combustion engine by using thermosensor 7 according to the present invention. The values thereby detected are then sent over connecting line 18 to control unit 17, which next performs control or regulation of the internal combustion engine on the basis of the values.

Since thermosensor 7 is integrated into spark plug 1, no separate space for a temperature sensor need be provided in the internal combustion engine. The present invention may therefore also be used in particular with very compact small-displacement engine designs. Influences of injection into combustion chamber 19 and of a charge cycle are detectable and measurable due to the positioning of thermosensor 7. In particular scattering in stratified operation or in homogeneous operation is also detectable in this way and then corresponding countermeasures may be initiated via control unit 17. Knocking and misfiring are also detectable by the thermosensor according to the present invention through corresponding changes in temperature in combustion chamber 19. Control unit 17 may thus respond immediately in an appropriate manner and adjust parameters of the internal combustion engine to achieve optimum combustion appropriate for the conditions.

Figure 3:
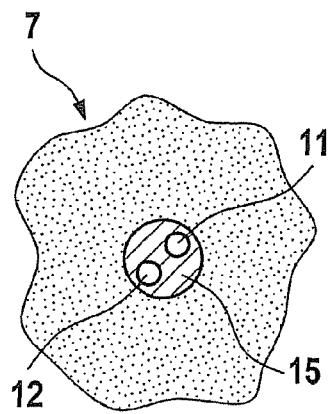
FIG. 3 shows a view from above of a polished surface of the spark plug without applied coatings.

FIG. 3 shows a view of thermosensor 7 from above in a polished state, in which layer 9 containing chromium and protective layer 10 have not yet been applied. Both thermolines 11, 12 are still exposed, and in a first step for manufacturing thermosensor 7 according to the present invention, fine mechanical machining is performed to obtain a surface having the least roughness. In the next step, the thermosensor is coated with a material containing chromium to restore the function of the thermosensor. Layer 9 containing chromium connects both thermolines 11, 12. A protective layer 10 containing carbon is then applied to protect layer 9 containing chromium.

Since layer 9 containing chromium and protective layer 10 have only a very small thickness, a rapid temperature measurement may be performed, the sampling rate of the sensor being up to 100 kHz.

It should also be pointed out that as an alternative, thermosensor 7 could also be integrated into measurement electrode 2, in which case thermosensor 7 must then be integrated into measurement electrode 2 in such a way that one end face of thermosensor 2 is exposed to combustion chamber 19.

Through the spark plug according to the present invention, a thermosensor may thus be situated directly in the combustion chamber without any need for additional space to detect cycle-specific temperature values in the combustion chamber. Control unit 17 then converts the temperature values thereby obtained into pressure values to execute corresponding control or regulating operations of the internal combustion engine. Since the temperatures on exposed end area 7a of thermosensor 7 are relatively high, there are also no problems due to deposits on the thermosensor because they are burned off at these high temperatures. The spark plug according to the present invention having a thermosensor may thus be used for long periods with no problem.

What is claimed is:

1. A spark plug comprising:
   a ground electrode;
   a center electrode; and
   a thermosensor for detecting a temperature, the thermosensor being situated on a combustion chamber-side end of the spark plug, and one end area of the thermosensor being situated on the spark plug such that it is exposed,
   wherein the thermosensor includes a first thermoline and a second thermoline,
   wherein the end area of the thermosensor has a layer containing chromium,
   wherein the layer containing chromium connects the first thermoline and the second thermoline to each other.

2. The spark plug according to claim 1, wherein the thermosensor is situated next to the ground electrode or is integrated into the ground electrode.

3. The spark plug according to claim 1, wherein the thermosensor is situated opposite the ground electrode.

4. The spark plug according to claim 1, wherein the end area of the thermosensor has a protective layer applied to the layer containing chromium.

5. The spark plug according to claim 4, wherein the layer containing chromium contains pure chromium or a conductive chromium oxide.

6. The spark plug according to claim 4, wherein the protective layer is a layer containing carbon.

7. The spark plug according to claim 4, wherein the protective layer is a C2 carbon layer.

8. The spark plug according to claim 4, wherein the protective layer covers an end face of the end area of the thermosensor and covers a lateral shell area of the layer containing chromium.

9. The spark plug according to claim 1, wherein the thermosensor is situated in a housing of the spark plug.

10. The spark plug according to claim 4, wherein at least one of (a) the layer containing chromium has a layer thickness between 0.1 μm and 10 μm and (b) the protective layer has a layer thickness between 0.1 μm and 10 μm.

11. The spark plug according to claim 4, wherein a layer thickness of the layer containing chromium is the same as a layer thickness of the protective layer.

12. The spark plug according to claim 1, wherein the end area of the thermosensor protrudes in an axial direction of the spark plug the same distance as or a shorter distance than the ground electrode away from a spark plug base plane.

13. An internal combustion engine comprising:
    a spark plug including a thermosensor;
    a combustion chamber; and
    a control unit connected to the thermosensor, the control unit being designed to control the internal combustion engine, based on values transmitted by the thermosensor,
    wherein the thermosensor includes a first thermoline and a second thermoline,
    wherein an end area of the thermosensor has a layer containing chromium,
    wherein the layer containing chromium connects the first thermoline and the second thermoline to each other.

14. The internal combustion engine according to claim 13, wherein the control unit calculates pressure values in the internal combustion engine from the values received from the thermosensor and controls the internal combustion engine based on the calculated pressure values.

15. The internal combustion engine according to claim 13, wherein the control unit adjusts at least one of an ignition time, an injection time, an injection length, an opening time of valves, a closing time of valves, an addition of air and an internal or external exhaust gas recirculation, based on the values received from the thermosensor.

* * * * *